United States Patent
Gupta et al.

(10) Patent No.: US 12,125,028 B2
(45) Date of Patent: *Oct. 22, 2024

(54) SYSTEMS AND METHODS FOR ACCESS TOKENS CONFIGURATION WITH UNIFORM RESOURCE LOCATOR (URL) PARAMETERS

(71) Applicant: Capital One Services, LLC, McLean, VA (US)

(72) Inventors: Varun Gupta, Edison, NJ (US); Allison Fenichel, Brooklyn, NY (US); Johanna Davis, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/359,078

(22) Filed: Jul. 26, 2023

(65) Prior Publication Data
US 2023/0370470 A1    Nov. 16, 2023

Related U.S. Application Data

(63) Continuation of application No. 18/051,254, filed on Oct. 31, 2022, now Pat. No. 11,757,896, which is a continuation of application No. 16/706,947, filed on Dec. 9, 2019, now abandoned.

(51) Int. Cl.
| | |
|---|---|
| *H04L 9/40* | (2022.01) |
| *G06Q 20/36* | (2012.01) |
| *G06Q 20/38* | (2012.01) |
| *G06Q 20/40* | (2012.01) |

(52) U.S. Cl.
CPC ....... *G06Q 20/385* (2013.01); *G06Q 20/3674* (2013.01); *G06Q 20/405* (2013.01); *H04L 63/0876* (2013.01); *H04L 63/102* (2013.01); *H04L 63/20* (2013.01)

(58) Field of Classification Search
CPC .... H04L 63/102; H04L 63/0876; H04L 63/20
See application file for complete search history.

(56) References Cited

U.S. PATENT DOCUMENTS

| | | | |
|---|---|---|---|
| 2011/0154130 A1* | 6/2011 | Helander | H04L 63/168 714/48 |
| 2013/0136253 A1* | 5/2013 | Liberman Ben-Ami | H04M 3/5191 379/265.09 |
| 2021/0352072 A1* | 11/2021 | Effing | H04L 9/3228 |

* cited by examiner

*Primary Examiner* — Khoi V Le
(74) *Attorney, Agent, or Firm* — Foley & Lardner LLP (57) ABSTRACT

In some embodiments, Uniform Resource Locator (URL) parameters may be used to bind access tokens to authorize web-browser-initiated network operations. In some embodiments, a user input at a data exchange gateway associated with a first website to perform a first network operation (e.g., a request to access resources associated with the first website) may be detected. In response to the detected user input, an access token may be generated based on user specific information associated with the user, where the access token is associated with one or more network operation parameters. In response to a use of the access token for authorizing the first network operation and successful authorization of the first network operation, the access token may be configured to be bound to a first URL identifier parameter associated with the first website.

19 Claims, 8 Drawing Sheets

SYSTEMS AND METHODS FOR ACCESS TOKENS CONFIGURATION WITH UNIFORM RESOURCE LOCATOR (URL) PARAMETERS

CROSS-REFERENCE TO RELATED APPLICATIONS

This application is a continuation of U.S. patent application Ser. No. 18/051,254, filed Oct. 31, 2022, which is a continuation of U.S. patent application Ser. No. 16/706,947, filed Dec. 9, 2019. The content of the foregoing applications is incorporated herein in its entirety by reference.

BACKGROUND

Access tokens enable users to access resources of one or more entities. For instance, in the context of web services, in response to a user logging into a web service of an entity via a user device, the web service may issue a token (e.g., JSON web token or other token) to the user device. Each subsequent request of the user device to the web service will include the token, allowing the user to access services and other resources that are permitted with that token based on an authorization of the requests. However, to prevent malicious use of such access tokens at websites or other entities for which the access token is not intended, there is a need to bind access tokens to one or more parameters such that subsequent use of the access token (e.g., for one or more network operations) is restricted to entities (e.g., websites) associated with such parameters.

SUMMARY

To address one or more of the foregoing issues, in some embodiments, a system may bind an access token to a first URL domain network operation parameter associated with a first website, where subsequent use of the access token is restricted to websites associated with the first URL domain network operation parameter. For example, the system may monitor web browsing interactions with a web browsing application on a user device accessing a first website. The system may detect a user input at a data exchange gateway associated with the first website to perform a first network operation (e.g., a request to access resources associated with the first website) based on the monitoring of the web browsing interactions. In response to the detected user input, the system may generate an access token at the web browsing application, based on user account information associated with the user, where the access token is associated with (i) an authentication credential and (ii) one or more network operation parameters. In response to a use of the access token for authorizing the first network operation and successful authorization of the first network operation, the system may bind the access token to a first URL domain network operation parameter associated with the first website, such that use of the access token is restricted to websites associated with the first URL domain network operation parameter.

BRIEF DESCRIPTION OF THE DRAWINGS

The accompanying drawings, which are incorporated in and constitute a part of his specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

The following description is directed to binding of unique tokens with merchant identifiers to authorize online transactions, and is made by example only. It should be appreciated that the present disclosure is not limited to the specific disclosed embodiments and details, which are exemplary only. It is further understood that one possessing ordinary skill in the art, would appreciate the use of the embodiments of the present disclosure for their intended purposes and benefits in any number of alternative embodiments, depending on specific design and other needs. The systems and methods discussed herein may be just as applicable in other environments that may benefit from the ability to bind unique tokens to online merchants and/or authorize payment transactions conducted at the online merchant.

Figure 1:
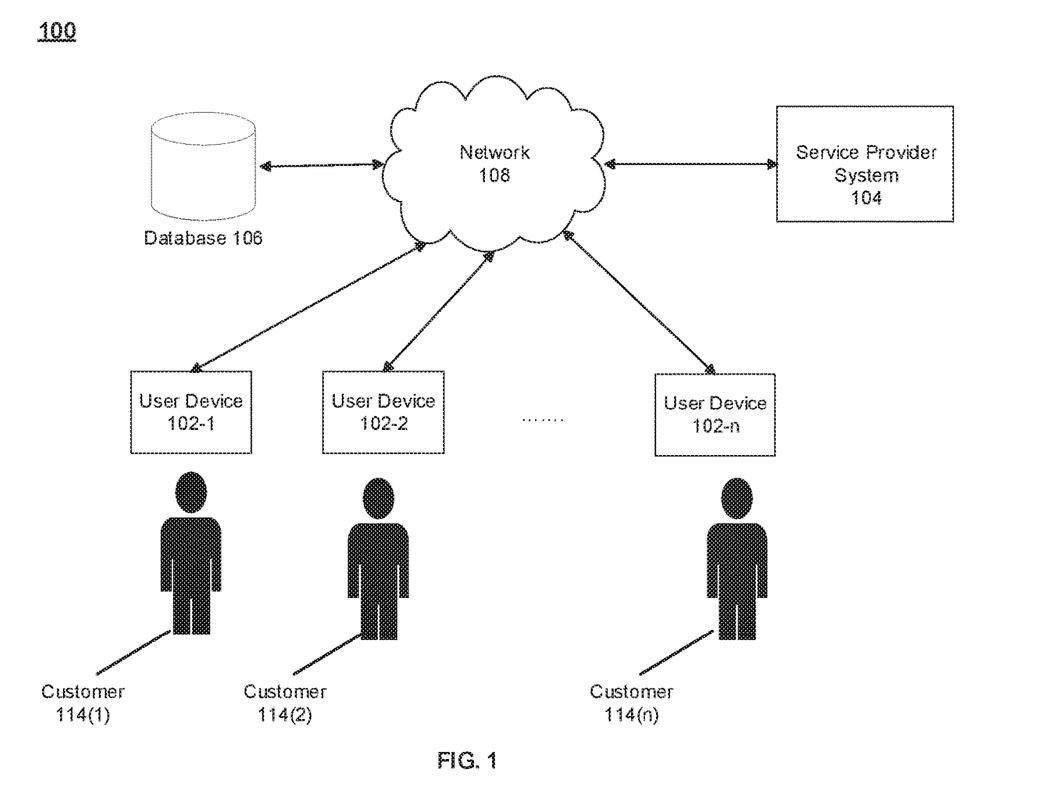
FIG. 1 is a block diagram of an exemplary system, consistent with disclosed embodiments.

FIG. 1 is a block diagram of an exemplary system 100 for performing one or more operations consistent with disclosed embodiments. In some embodiments, system 100 includes one or more user devices 102(1), 102(2), . . . , 102(n), one or more service provider systems 104, one or more databases 106, and a network 108. The components and arrangement of the components included in system 100 may vary. Thus, system 100 may include other components that perform or assist in the performance of one or more operations consistent with the disclosed embodiments.

As more fully described below, components of system 100 may include one or more computing devices (e.g., computer(s), server(s), etc.), memory storing data and/or software instructions (e.g., database(s), memory devices, etc.), and other known computing components. In some embodiments, the one or more computing devices may be configured to execute software instructions stored in the memory to perform one or more operations consistent with the disclosed embodiments. Aspects of service provider system(s) 104, database(s) 106, and user devices 102(1)-102(n) may be configured to communicate with one or more other components of system 100 via network 108, for example. In certain aspects, customers 114(1)-114(n) are respectively associated with and operate user devices 102(1)-102(n), to interact with one or more components of system 100 by sending and receiving communications, initiating operations, and/or providing input for one or more operations consistent with the disclosed embodiments. By way of example, customer 114(1) may be a first customer and customer 114(2) may be a second customer. Customers 114(1)-114(n) may each have a financial banking account with service provider system 104.

Service provider system 104 may be configured to access one or more payment parameters and one or more transaction parameters associated with user device 102(1). The one or more payment parameters and one or more transaction parameters may be stored in database 106 by service provider system 104 upon successful authorization of a payment transaction associated with user device 102(1) at a merchant website of a merchant. The one or more payment parameters may include user personal identification information or user financial account information. The user personal identification information includes at least one of name, address, date of birth, phone number, or zip code. The user financial account information includes at least one of bank name, bank address, or billing address. The one or more transaction parameters include at least one of a merchant category code associated with the merchant, a name of the merchant, a masked name of the merchant, a merchant identifier number of the merchant, or at least one of the one or more payment parameters.

Database 106 of system 100 may be communicatively coupled to service provider system 104 and user devices 102(1)-102(n) via network 108. Database 106 may include one or more memory devices that store information and are accessed and/or managed by one or more components of system 100. By way of example, database 110 may include Oracle™ databases, Sybase™ databases, or other relational databases or nonrelational databases, such as Hadoop sequence files, HBase, or Cassandra. Database 106 may include computing components (e.g., database management system, database server, etc.) configured to receive and process requests for data stored in memory devices of database 106 and to provide data from database 106.

Database 106 is configured to store one or more payment parameters and one or more transaction parameters as, for example, described above. The one or more payment parameters may include user personal identification information or user financial account information as, for example, described above.

Service provider system 104 may be associated with a financial service entity that provides, maintains, manages, or otherwise offers financial services. For example, the financial service entity may be a bank, credit card issuer, or any other type of financial service entity that generates, provides, manages, and/or maintains financial service accounts for one or more users. Financial service accounts may include, for example, credit card accounts, loan accounts, checking accounts, savings accounts, reward or loyalty program accounts, and/or any other type of financial service account known to those skilled in the art. In providing, maintaining, managing or otherwise offering financial services, service provider system 104 may be enabled to authenticate financial transactions associated with financial service accounts of customers 114(1)-114(n).

In one aspect, service provider system 104 may include one or more computing devices, configured to perform one or more operations consistent with disclosed embodiments, as described more fully below in relation to FIG. 3. In one aspect, service provider system 104 may include one or more servers or server systems. Service provider system 104 may include one or more processors configured to execute software instructions stored in a memory or other storage device. The one or more processors may be configured to execute the stored software instructions to perform internet-related communication and financial service-based processes and provide binding of unique tokens with merchant identifiers to authorize transactions. The one or more computing devices of service provider system 104 may also be configured to communicate with other components of system 100 to predict geolocations of customers 114(1)-114(n). In some embodiments, service provider system 104 may provide one or more mobile banking applications, web-sites, browser extensions, or online portals that are accessible by user devices 102(1)-102(n) over network 108. The disclosed embodiments are not limited to any particular configuration of service provider system 104.

Service provider system 104 and user devices 102(1)-102(n) may be configured to communicate with each other over network 108. Network 108 may comprise any type of computer networking arrangement configured to provide communications or exchange data, or both, between components of system 100. For example, network 108 may include any type of network (including infrastructure) that provides communications, exchanges information, and/or facilitates the exchange of information, such as the Internet, a private data network, a virtual private network using a public network, a LAN or WAN network, a Wi-Fi™ network, and/or other suitable connections that may enable information exchange among various components of system 100. Network 108 may also include a public switched telephone network ("PSTN") and/or a wireless cellular network. Network 108 may be a secured network or unsecured network. In some embodiments, one or more components of system 100 may communicate directly through a dedicated communication link(s).

User devices 102(1)-102(n) may be one or more computing devices configured to perform one or more operations consistent with the disclosed embodiments, as described more fully below in relation to FIG. 2. User devices 102(1)-102(n) may execute browser or related mobile display software that displays customer account profiles and interfaces for financial transactions, on a display included in, or connected to, user devices 102(1)-102(n). User devices 102(1)-102(n) may also store and execute other mobile applications that allow customers 114(1)-114(n) to select a method by which customers 114(1)-114(n) wish to receive notifications from service provider system 104.

It is to be understood that the configuration of the functional blocks of system 100 has been defined herein for convenience of description. The components and arrangement of the components included in system 100 may vary. For example, in some embodiments, system 100 may include other components that perform or assist in the performance of one or more processes consistent with disclosed methods. System 100 includes a number of components generally described as computing devices. Each of the computing devices may include any number of computing components particularly configured as a special purpose computing device to perform the functionality disclosed herein. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
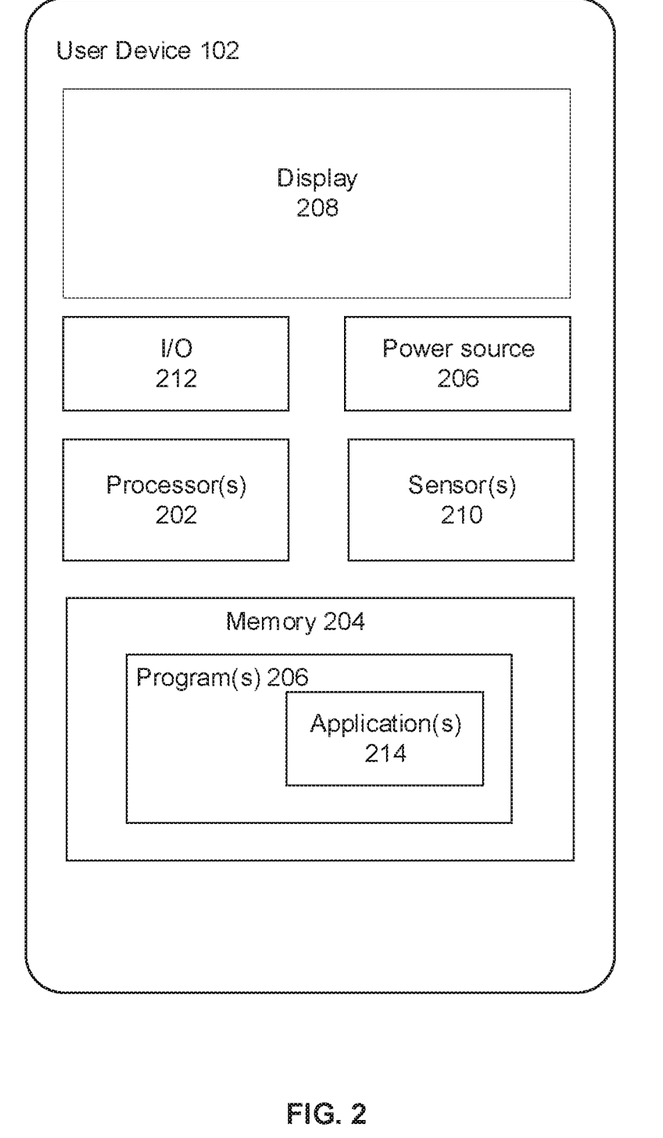
FIG. 2 is a block diagram of an exemplary user device, consistent with disclosed embodiments.

FIG. 2 shows an exemplary configuration of user device 102(1), consistent with disclosed embodiments. User devices 102(2)-102(n) may be similarly configured. User device 102(1) enables associated customer 114(1) to perform remote interactions or mobile transactions with service provider system 104, for example, or receive information from service provider system 104. In some embodiments, user device 102(1) may be a personal computing device. For example, user device 102(1) may be a smartphone, a laptop or notebook computer, a tablet, a multifunctional watch, a pair of multifunctional glasses, or any mobile or wearable device with computing ability, or any combination of these computers and/or affiliated components.

User device 102(1) includes one or more processors 202 configured to execute software instructions stored in memory, such as a memory 204. Memory 204 may store one or more software programs 206 that when executed by processor 202 perform known Internet-related communication, content display processes, and other interactive processes for customer 114(1). For instance, user device 102(1) may execute a browser or related mobile display software that generates and displays interfaces including content on a display device 208 included in, or in communication with, user device 102(1). User device 102(1) may be a mobile device that executes mobile device applications and/or mobile device software, included in programs 206, that allows user device 102(1) to communicate with service provider system 104 and other components via network 108, to generate and display content in interfaces via display device 208. The disclosed embodiments are not limited to any particular configuration of user device 102(1). User device 102(1) may include any arrangement of one or more computing devices configured to perform one or more operations consistent with disclosed embodiments.

User device 102(1) may be configured to store, in memory 204, one or more operating systems that perform known operating system functions when executed by processor 202. By way of example, the operating systems may include Microsoft Windows™, Unix™, Linux™ Android™, Apple™ Mac OS operating systems, iOS, Chrome OS, or other types of operating systems. Accordingly, disclosed embodiments may operate and function with computer systems running any type of operating system. User device 102(1) may also include communication software stored in memory 204 that, when executed by processor 202, provides communications with network 108, such as Web browser software, tablet or smart handheld device networking software, etc.

Display device 208 may include, for example, a liquid crystal display (LCD), a light emitting diode screen (LED), an organic light emitting diode screen (OLEO), a touch screen, and other known display devices. Display device 208 may display various information to customer 114(1). For example, display device 208 may display an interactive interface to customer 114(1) enabling customer 114(1) to operate user devices 102(1) to perform certain aspects of the disclosed methods. Display device 208 may display touchable or selectable options for customer 114(1) to select and may receive customer selection of options through a touch screen.

User device 102(1) includes I/O devices 212 that allow user device 102(1) to send and receive information or interact with customer 114(1) or another device. For example, I/O devices 212 may include various input/output devices, such as a keyboard, a mouse-type device, a gesture sensor, an action sensor, a physical button, switch, microphone, touchscreen panel, stylus, etc., that may be manipulated by customer 114(1) to input information using user devices 102(1). I/O devices 212 may also include an audio output device, such as a speaker configured to provide sound and audio feedback to customer 114(1) operating user device 102(1). In some embodiments, I/O devices 212 may include a light emitting component, such as an LED or other component capable of providing a visible signal to customer 114(1). I/O devices 212 may also include haptic output devices, to provide haptic feedback to customer 114(1). I/O devices 212 may also include one or more communication modules (not shown) for sending and receiving information from other components in system 100 by, for example, establishing wired or wireless connectivity between user device 102(1) and network 108. I/O devices 212 may include radio frequency, infrared, or other near-field communication interfaces, for communicating with other devices associated with network 108 or customer 114(1). Exemplary communication modules of I/O devices 212 may include, for example, a short-range or near field wireless communication modem, a Wi-Fi™ communication modem, or a cellular communication modem. I/O devices 212 may include a transceiver or transmitter configured to communicate using one or more wireless technologies/protocols that may include, without limitation, cellular (e.g., 3G, 4G, etc.) technology, Wi-Fi™ hotspot technology, RFID, near-field communication (NFC) or BLUETOOTH® technologies, etc. More generally, any uni- or bi-directional communication technology known to one of ordinary skill in the art may be implemented in user device 102(1) to exchange information with service provider system 104 or database 106 via network 108.

As described above, user device 102(1) may be a device that executes mobile applications for performing operations consistent with disclosed embodiments. Thus, in some embodiments, programs 206 stored on user devices 102(1) may include one or more software applications 214 installed thereon, that enable user device 102(1) to communicate with service provider system 104 via network 108 and perform aspects of the disclosed methods. For example, user device 102(1) may connect to service provider system 104 by using browser software to access and receive information or perform other operations associated with an internet service provider.

According to an exemplary embodiment, software applications 214 associated with service provider system 104 may be installed on user device 102(1), as shown in FIG. 2. For example, service provider system 104 may receive a request from user device 102(1) to download one or more software applications 214 to user device 102(1). In one embodiment, service provider system 104 may receive the request from customer 114(1), using a web browser application installed on user device 102(1). In another embodiment, service provider system 104 may receive the request to download one or more software applications 214 associated with service provider system 104 onto user device 102(1) from a webpage or another portal associated with service provider system 104 accessed by customer 114(1) via, e.g., user device 102(1). In this embodiment, service provider system 104 may store software instructions corresponding to one or more software applications 214 in database 106. For responding to the download request, service provider system 104 may receive additional information from user device 102(1) regarding the particular device specifications of user device 102(1) to enable user device 102(1) to download software instructions corresponding to the particular specifications. Alternatively, service provider system 104 may push a download request link to user device 102(1) or transmit software code corresponding to one or more software applications 214 directly to user device 102(1) in, for example, an e-mail, a text or short message service (SMS) message, a prompt through an app, or other suitable method. User device 102(1) may receive the software code related to one or more software applications 214, such as via network 108, to download and install the software code.

Figure 3:
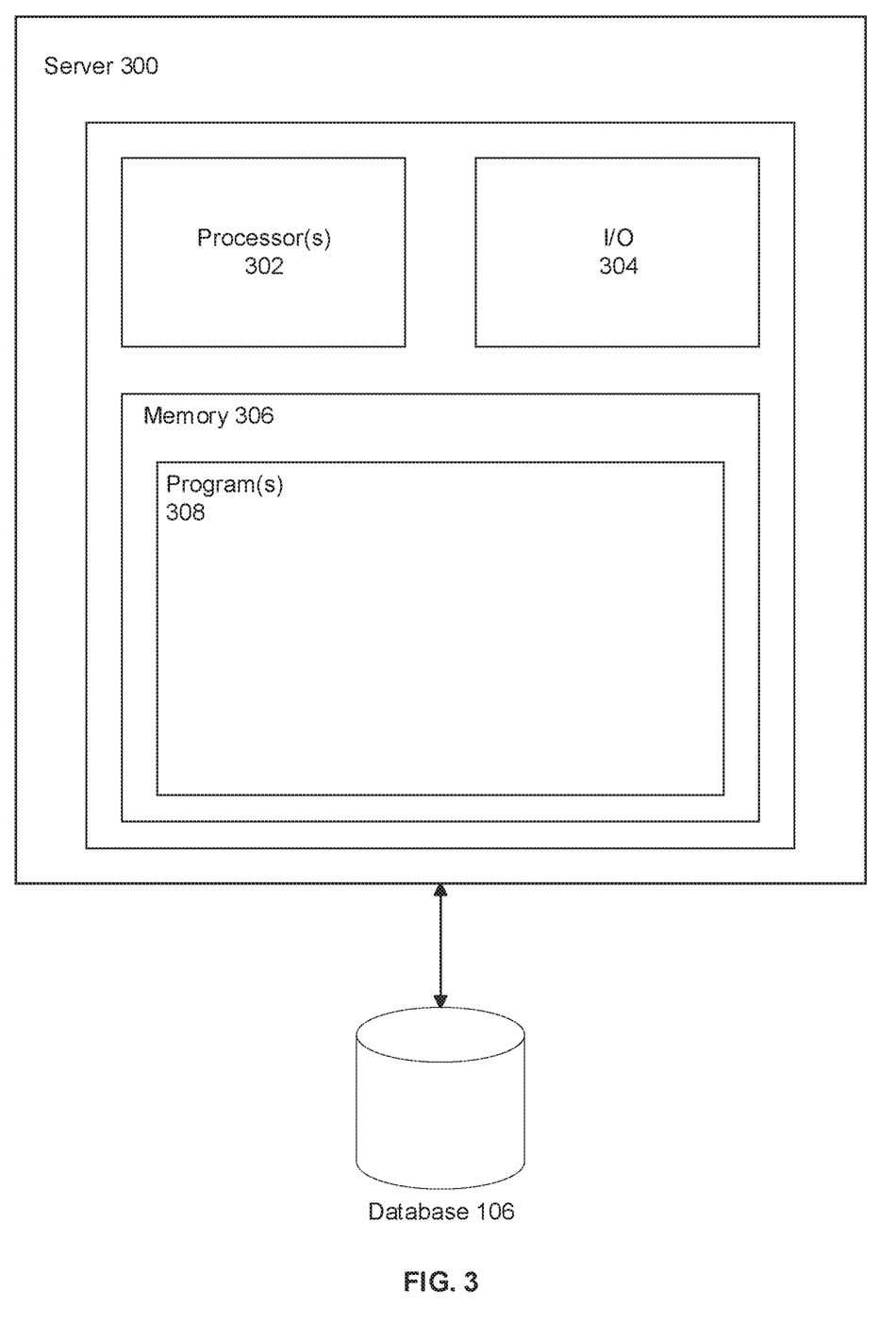
FIG. 3 is a block diagram of an exemplary server system, consistent with disclosed embodiments.

FIG. 3 shows an exemplary server 300 consistent with the disclosed embodiments. Variations of exemplary server 300 may constitute one or more components of service provider system 104. In one embodiment, server 300 includes one or more processors 302, one or more input/output (I/O) devices 304, and one or more memories 306. In some embodiments, server 300 may be a part of service provider system 104. In some embodiments, server 300 may take the form of a specially programmed server or computing system used by service provider system 104. In some embodiments, server 300 may be configured as an apparatus, embedded system, dedicated circuit, or the like based on the storage, execution, and/or implementation of software instructions that perform one or more operations consistent with the disclosed embodiments.

Processor(s) 302 may include one or more known processing devices, such as a microprocessor from the Pentium™ or Xeon™ family manufactured by Intel™, or the Turion™ family manufactured by AIVIO™, for example. The disclosed embodiments are not limited to any type of processor(s) otherwise configured to meet the computing demands required of different components of system 100.

Input/output (I/O) devices 304 may include various input/output devices, such as a keyboard, a mouse-type device, a gesture sensor, an action sensor, a physical button, switch, microphone, touchscreen panel, stylus, etc. I/O devices 304 may also include an audio output device. Exemplary communication modules of I/O devices 304 may include, for example, a short-range or near field wireless communication modem, a Wi-Fi™ communication modem, or a cellular communication modem. I/O devices 304 may include a transceiver or transmitter configured to communicate using one or more wireless technologies/protocols that may include, without limitation, cellular (e.g., 3G, 4G, etc.) technology, Wi-Fi™ hotspot technology, RFID, near-field communication (NFC) or BLUETOOTH® technologies, etc. More generally, any uni- or bi-directional communication technology known to one of ordinary skill in the art may be implemented in server 300 to exchange information with user devices 102(1)-102(n) or database 106 via network 108.

Memory 306 may include one or more storage devices configured to store instructions used by processor 302 to perform functions related to disclosed embodiments. For example, memory 306 may be configured with one or more software instructions, such as program(s) 308 that may perform one or more operations when executed by processor(s) 302. The disclosed embodiments are not limited to separate programs or computers configured to perform dedicated tasks. For example, memory 306 may include a single program 308 that performs the functions of server 300, or program 308 may comprise multiple programs. In certain embodiments, memory 306 may store sets of instructions or programs 308 for receiving and storing a list of form fields of a checkout form associated with a plurality of websites, monitoring user interactions with the plurality of websites, predicting geolocations of customers 114(1)-114(n) based on analyzing user parameters associated with customers 114(1)-114(n). These sets of instructions may be executed by processor(s) 302 to perform communication and/or processes consistent with disclosed embodiments.

FIGS. 4A-4E contain a flowchart of an exemplary process 400 for binding of unique tokens with merchant identifiers to authorize transactions, consistent with disclosed embodiments. In certain aspects, service provider system 104 utilizes server 300 to execute software instructions that perform one or more of the operations of process 400. Also, server 300 may perform all of the functions of service provider system 104.

Figure 4A:
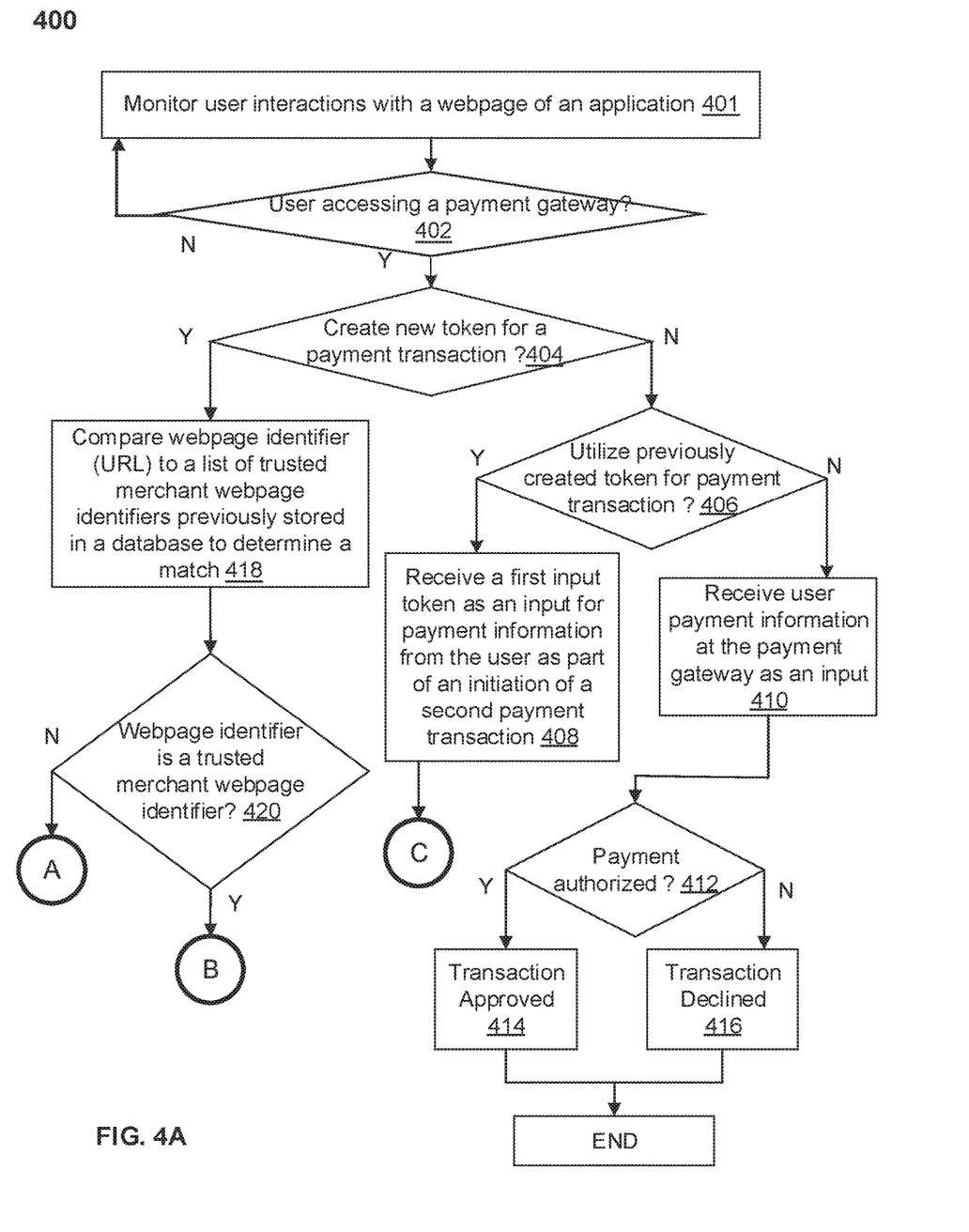
FIG. 4A-4E contain a flowchart of an exemplary process of binding unique tokens with merchant identifiers to authorize transactions, consistent with disclosed embodiments.

Service provider system 104 in step 401 of FIG. 4A monitors user interactions with one or more of software applications installed on user device 102(1). The user interactions may include any interaction of customer 114(1) with the one or more software applications installed on user device 102(1). The one or more software applications may include web browser applications and/or e-commerce merchant applications, although any other user interactions with a software application may also be included. The e-commerce merchant applications are from e-commerce merchants. The e-commerce merchants may include, e.g., www.amazon.com, www.walmart.com, or www.ebay.com, although any other e-commerce merchants may also be included. The user interactions may include any user interaction with a website displayed via a web browser application.

The user interactions may further include a request to generate a token at a mobile application using a mobile device. The mobile application may include a user interface that includes options to generate a token for a plurality of websites, which include e-commerce websites. By way of example, the mobile application may include a button, which upon selection from the user generates a token. The user may then proceed to utilize the token at a merchant of their choice. Upon successful payment authorization at the merchant, the token is bound to that merchant. In another example, the mobile application may include a list of merchant names for which the user would like to generate a token. Upon selecting a merchant name from the lists of merchant names, the token is generated for that merchant. The user may then proceed to utilize the token to complete a purchase at the selected merchant. Upon successful payment authorization at the merchant, the token is bound to that merchant.

The user interactions may be monitored by web extensions installed on a website, web browser, or a user device 102(1) utilized by customer 114(1). The web extensions may monitor a user interaction with a website, including detecting one or more payment fields associated with the website, or where the user interaction may include customer 114(1) entering payment information on a website. Customer 114(1) may enter payment information for various purposes, e.g., making a charitable donation and/or making a purchase. In another example, the user interactions may also include, entering a credit card number in a credit card field of a browser interface, receiving a form filled by the customer 114(1) manually via a mobile application, a website, or any payment mechanism and generating a token based on the received form. The received form may include customer 114(1) personal information and/or user payment information. The customer 114(1) personal information may include customers address, name, age and/or marital status, although any other user information associated with the customer 114(1) may also be included. The user payment information may include credit card number, debit card number and/or bank account number, although any other user payment information may also be included. The token may be a virtual number unique to a specific website that is utilized by customer 114(1) in place of a credit card number, as explained in detail below.

Service provider system 104 in step 402 determines if customer 114(1) associated with user device 102(1) is accessing a payment gateway, based on monitoring customer 114(1) interactions with e-commerce websites. Service provider system 104 identifies that customer 114(1) is accessing a payment gateway when service provider system 104 detects a payment input field on a website, determines that customer 114(1) performs interactions such as clicking on a checkout button of the e-commerce website, customer 114(1) enters a credit card number on a website (websites may include any website where a payment is processed, e.g., charity website, e-commerce websites, etc.), accesses a checkout webpage displayed on a web browser software application installed on user device 102(1), web browsers an e-commerce website via a web browser, adds items in an online shopping cart of the e-commerce website, opens a mobile application installed on user device 102(1), or clicks on an item in the e-commerce website, although any other user interaction with a software application may also be included. When service provider system 104 determines that customer 114(1) associated with user device 102(1) is not at a payment gateway of the e-commerce website, then process 400 takes the No branch of step 402 to loop back to step 401. When service provider system 104 determines that customer 114(1) associated with user device 102(1) is at a payment gateway of the e-commerce website, process 400 takes the Yes branch of step 402 to step 404.

Service provider system 104 in step 404 displays a prompt on the e-commerce website asking if customer 114(1) would like to generate a unique token that can be utilized as part of the payment transaction process. The token is a unique sequence of numbers that is utilized by a customer, e.g., customer 114(1), in place of a credit card number. This unique sequence of numbers is also referred to as a virtual number. The token may provide advantages of protecting credit card numbers from being compromised and thus may provide the advantage of avoiding replacements of physical credit cards. By utilizing virtual numbers in place of credit card numbers, credit card numbers will not be compromised. Further, the token also may provide advantages to the customer of obviating the need to input or enter their credit card number each time while making a payment transaction. By not entering their credit card number each time, the chance of fraudulent activities associated with processing of credit card numbers to authorize a purchase transaction is reduced. The creation of tokens is explained in detail below.

The prompt displayed on the e-commerce website in step 404 may display a message such as "Would you like to generate a new token?", with two options of "Yes" or "No" to select from. When customer 114(1) selects the "No" option, service provider system 104 determines that customer 114(1) would not like to generate a new token and process 400 takes the No branch of step 404 to step 406. When customer 114(1) selects the "Yes" option, service provider system 104 determines that customer 114(1) would like to perform a payment transaction with a new token, referred to herein as a first payment transaction for convenience of explanation, at the e-commerce website and would like to generate a new token. Process 400 takes the Yes branch of step 404 to step 418.

Service provider system 104 in step 418 compares a webpage identifier associated with the e-commerce website, where customer 114(1) is performing the first payment transaction, to a list of trusted merchant webpage identifiers previously stored in database 106. The list of trusted merchant webpage identifiers includes a list of uniform resource locators (URLs) associated with e-commerce websites that may be predefined by a system administrator and stored on database 106. The e-commerce websites associated with the list of trusted merchant webpage identifiers may be determined by the system administrator to be those websites that are popular and most frequently used in the e-commerce market environment. By way of example, the list of known or trusted merchant webpage identifiers may include www.amazon.com, www.walmart.com, www.macys.com, www.kohls.com, www.target.com, www.verizon.com, or www.ebay.com, although any other website may also be included. In this example, the webpage identifier associated with the e-commerce website, where customer 114(1) is performing the first payment transaction, is www.xyz.com. Based on the comparison, service provider system 104 determines that the www.xyz.com webpage identifier associated with the e-commerce website, where customer 114(1) is performing the first payment transaction, does not match any entry in the list of the known or trusted merchant webpage identifiers stored in database 106.

In another example, a user may utilize a mobile application that may include a button, which upon selection generates a token. The generated token in this example is independent of a webpage identifier or a merchant. Further, service provider system 104 generates a token that is a unique number, such that each customer will be provided with a token that is unique to the customer and is different than any other tokens. The user may then proceed to utilize the token at a merchant webpage of their choice. The token may be a 16-digit number that the user may input in a credit card number field on a payment interface. By entering the unique token in place of the credit card number, this technology provides advantages of protecting credit card numbers from being compromised. Since credit card numbers are not compromised, this technology provides the advantage of avoiding the need to replace of physical credit cards. Upon successful payment authorization at the merchant, the merchant website identifier is bound to the token.

Service provider system 104 in step 420 determines if the webpage identifier associated with the e-commerce website, where customer 114(1) is performing the first payment transaction is a known or trusted merchant webpage identifier. Based on the comparison performed in step 418, service provider system 104 determines that the www.xyz.com webpage identifier associated with the e-commerce website, does not match the list of known or trusted merchant webpage identifiers stored in the database 106. Therefore, service provider system 104 determines that the www.xyz.com webpage identifier is not a known or trusted merchant webpage identifier. Upon determining that the www.xyz.com webpage identifier is not a known trusted merchant webpage identifier, service provider system 104 takes the No branch of step 420 and proceeds to step 422 of FIG. 4B.

Figure 4B:
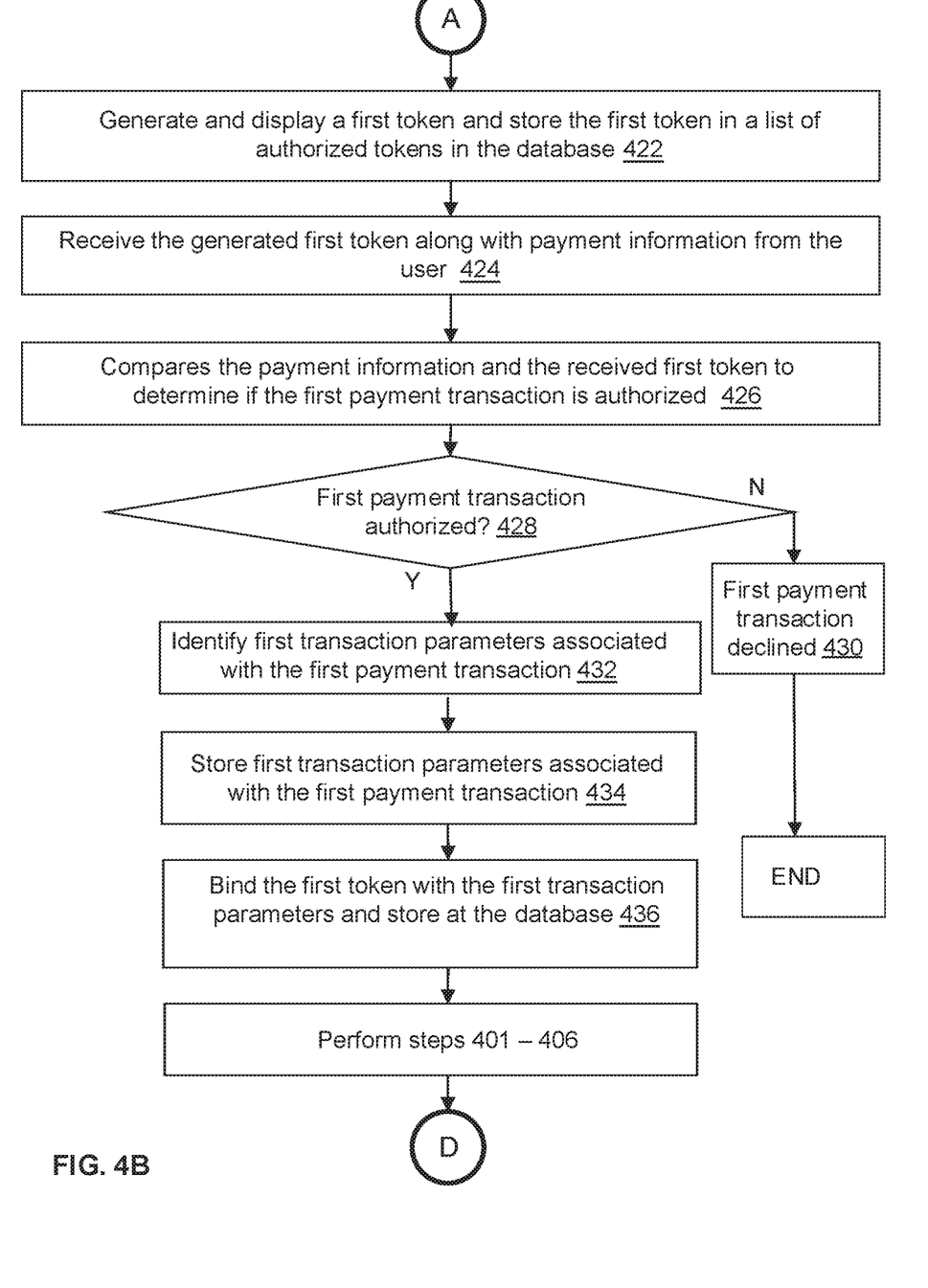

In step 422, service provider system 104 generates a first token which in this example is independent of a merchant webpage identifier or payment information. Service provider system 104 determines that customer 114(1) is logged into their bank account and associates the generated first token with the bank account of customer 114(1). Customer 114(1) may then proceed to utilize the first token at a merchant webpage of their choice for payment processing, merchant webpage having a merchant identifier. The first token may be a 16-digit unique number that customer 114(1) may input in a credit card number field on a payment interface and utilize for payment authorization. Upon successful payment authorization of payment at the merchant, the merchant website identifier is bound to the first token.

In another example, service provider system 104 may generate a first token based on user payment information detected in step 401. User payment information may include a credit card number or account identifier, a debit card number or account identifier, and/or a bank account number or account identifier. Service provider system 104, utilizes the user payment information to generate a first token. Service provider system 104 bounds the generated first token with the credit card number or account identifier, debit card number or account identifier, and/or bank account number or account identifier and stores it in memory 306.

In another embodiment, service provider system 104 in step 422 utilizes the merchant information (e.g. merchant webpage identifier associated with thee-commerce website) to generate a first token that is associated with the e-commerce website of www.xyz.com, where customer 114(1) is performing the first payment transaction. Service provider system 104 may receive user payment information from customer 114(1) as part of the first payment transaction. The user payment information may be received as an input from customer 114(1) via the e-commerce website. As described above, the user payment information may include a credit card number or account identifier, a debit card number or account identifier, a bank account number or account identifier, or any other financial account number or identifier that may be utilized to provide payment for the first payment transaction in association with a new unique token. Service provider system 104 bounds and stores in database 106, the webpage identifier associated with the e-commerce website, where customer 114(1) is performing the first payment transaction, and the payment information received from customer 114(1). Service provider system 104 generates a unique virtual number that may be utilized by the customer 114(1) to perform the first payment transaction. The generated virtual number may be a sequence of numbers determined by service provider system 104 to be unique. The virtual number is also referred to as a first token. In this example, the first token is "56781", although any other number may also be generated. The first token is then included in a list of authorized tokens stored in database 106. The first token is then displayed on the e-commerce website for customer 114(1) to view. Customer 114(1) may then utilize the first token for any future transactions in place of providing their physical account number, physical credit card number or physical debit card number.

By way of example, the first token may be unique to a specific e-commerce website where customer 114(1) would perform a first payment transaction. By way of another example, the first token is not unique to an e-commerce website where customer 114(1) is performing the first payment transaction. In this scenario, the first token initially may be utilized by customer 114(1) at any website.

Service provider system 104 in step 424 receives the generated first token along with payment information from customer 114(1) via the interface displayed on the e-commerce website as part of a transaction authorization request for the first payment transaction. The payment information may include merchant account information associated with the e-commerce website (e.g., merchant account number associated with a bank, etc.), phone number associated with the e-commerce website, location information associated with the e-commerce website (state, address, etc.), although any other transaction parameter associated with a transaction may also be included. The transaction authorization request may be generated upon receiving an input from customer 114(1) to process payment information. In step 422 the first token may also be stored on the web browser (e.g., using a browser plugin or extension) of user device 102(1) and in step 424 the first token may be automatically entered into an input box displayed on the e-commerce website by service provider system 104, upon the web browser extension receiving the first token from service provider system 104. In another example, the first token displayed in step 422 is inputted by customer 114(1) in an input box displayed on the e-commerce website in step 424.

Service provider system 104 in step 426 compares the received payment information received with the first token with the payment information and/or merchant information (e.g. webpage identifier associated with the e-commerce website) bound to the received first token to determine if the payment transaction is authorized. More particularly, service provider system 104 compares the received payment information with a payment information associated with the account that is bound to the received token that is previously stored in a database. When service provider system 104 determines that the payment information associated with the account that is bound to the received token matches with the received payment information, then service provider system 104 determines that the first payment transaction is authorized.

When service provider system 104 determines that the payment information bound with the account that corresponds to the received token does not match with the received payment information, then service provider system 104 determines that the first payment transaction is not authorized.

Service provider system 104 in step 428 determines if the first payment transaction has been authorized. When service provider system 104 determines that the first payment transaction is not authorized, then process 400 takes the No branch of step 428 to step 430. In step 430, service provider system 104 declines the first payment transaction and process 400 ends.

When service provider system 104 determines that the first payment transaction is authorized, then the process 400 takes the Yes branch to step 432.

Service provider system 104 in step 432, identifies first transaction parameters associated with the authorized first payment transaction. The first transaction parameters may include one or more merchant identifying information, such as a merchant category code associated with the e-commerce website for the first payment transaction, a merchant name, a name of the e-commerce website for the first payment transaction, a masked name of the e-commerce website for the first payment transaction, a webpage identifier of the e-commerce website for the first payment transaction, merchant account information associated with the e-commerce website (e.g., merchant account number associated with a bank, etc.), phone number associated with the e-commerce website, location information associated with the e-commerce website (state, address, etc.), although any other transaction parameter associated with a transaction may also be included. In this example, the merchant category code associated with the e-commerce website for the first payment transaction is "99771", the name of the e-commerce website for the first payment transaction is "xyz.com, Inc.", the webpage identifier of the e-commerce website for the first payment transaction is "www.xyz.com".

Service provider system 104 in step 434, stores the identified first transaction parameters in step 432 in database 106.

Service provider system 104 in step 436, associates the first transaction parameters with the first token stored in database 106. Further, the identified first transaction parameters are associated with the payment information and the webpage identifier corresponding to the first token stored in the database 106. This association of the first token with the first transaction parameters is also referred to herein as binding the first token with the first transaction parameters. Upon binding the first token with the first transaction parameters, the first token is unique to the e-commerce website and is referred to herein as a first unique token.

Service provider system 104 then returns to step 401. Service provider system 104 performs steps 401-406. In step 402, the service provider system 104 determines customer 114(1) has accessed the payment gateway to perform a second payment transaction different from the above described first payment transaction.

Upon reaching step 406, the service provider system 104 displays a prompt on the e-commerce website asking if customer 114(1) has previously generated a unique token for the e-commerce website. In this example, the first token is considered a previously generated unique token that the user would like to utilize to purchase an item as part of the second payment transaction. The prompt displayed on the website may display a message such as "Would you like to utilize a previously generated token?", with two option of "Yes" or "No" to select from. When customer 114(1) selects the "No" option, service provider system 104 determines that the customer 114(1) would not like to utilize a token and process 400 takes the No branch of step 406 to step 410. When customer 114(1) selects the "Yes" option, service provider system 104 determines that customer 114(1) would like to utilize a previously generated unique token and process 400 takes the Yes branch of step 406 to step 408.

In another embodiment, in step 406 service provider system 104 automatically populates a user payment information field with a previously created token for a second payment transaction. Service provider system 104 determines that customer 114(1) is logged into their account and identifies a previously created and stored token associated with the website that the customer 114(1) is at for the second payment transaction.

Figure 4C:
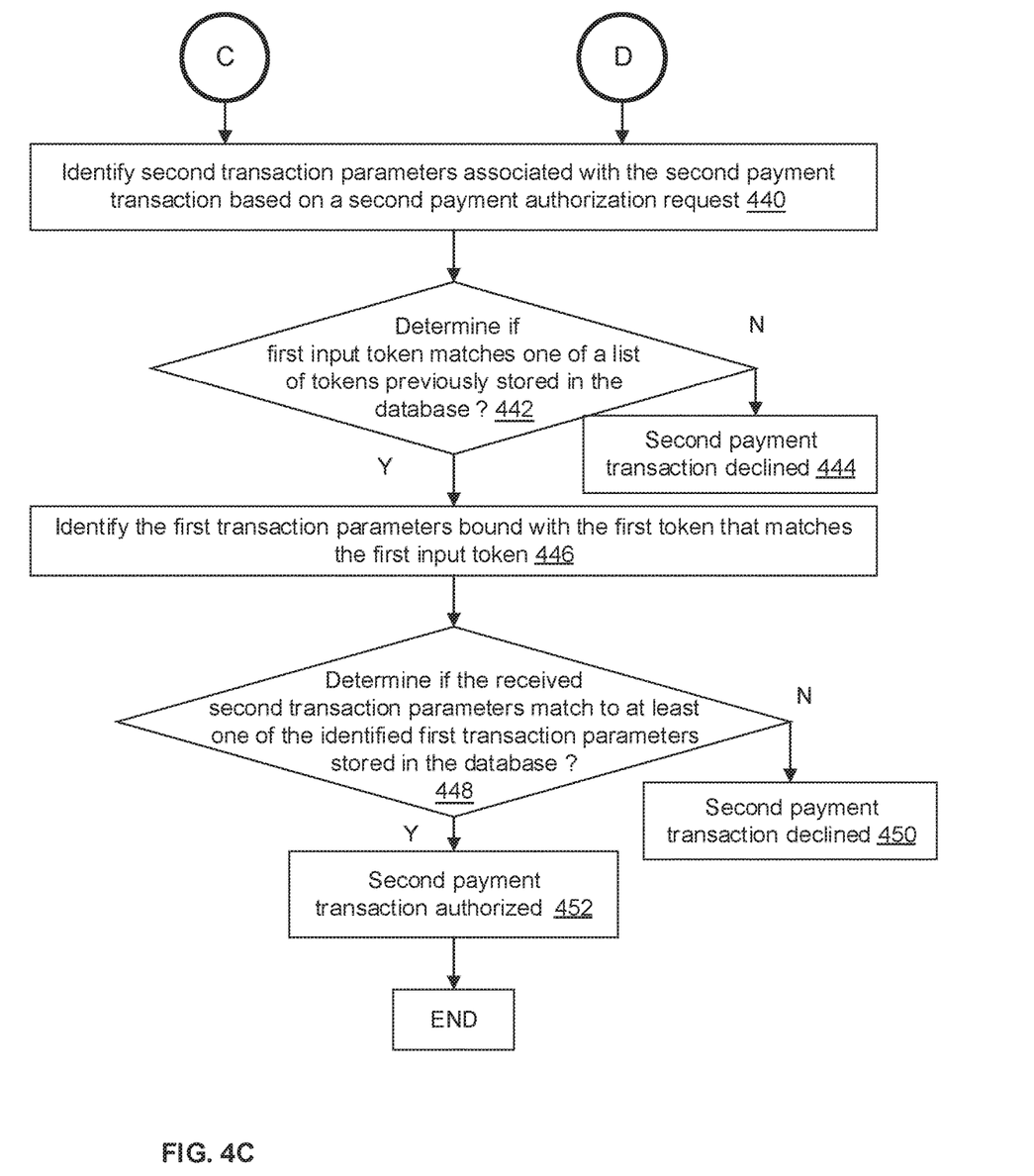

Service provider system 104 in step 440 identifies second transaction parameters associated with the second payment transaction in response to the second payment authorization request generated in step 408. In response to receiving the second payment authorization request with the first input token, service provider system 104 retrieves second transaction parameters from the second payment transaction. The second transaction parameters may include a merchant category code associated with the e-commerce website associated with the second payment transaction, a name of the e-commerce website associated with the second payment transaction, a masked name of the e-commerce website associated with the second payment transaction, and/or a webpage identifier of the e-commerce website associated with the second payment transaction.

Service provider system 104 in step 442 determines if the received first input token matches one of a list of tokens previously stored in database 106. Service provider system 104 compares the first input token with the list of authorized tokens stored in database 106. Service provider system 104 determines if the first input token matches to a token from the list of authorized tokens. When service provider system 104 determines that the first input token does not match any of the tokens included in the list of authorized tokens, then service provider system 104 determines that the second payment transaction is not authorized and the method takes the No branch of step 442 to step 444. In step 444, service provider system 104 determines that the second payment transaction has been declined and process 400 ends.

When service provider system 104 determines that the received first input token matches a token in the list of authorized tokens, then service provider system 104 takes the Yes branch of step 442 to step 446. In this example, service provider system 104 determines that the received first input token "56781", matches the first token "56781" stored in the list of authorized tokens.

Service provider system 104 in step 446 identifies the transaction parameters that are bound with the first token that matches to the first input token, based on the determination made in step 444 that the received first input token matches to the first token. In this example, service provider system 104 identifies that the transaction parameters that are bound with the first token are the first transaction parameters.

Service provider system 104 in step 448, determines if the received second transaction parameters associated with the first input token match at least one of the identified first transaction parameters associated with the first token.

In this example, the merchant category code associated with the e-commerce website for the second payment transaction is "99771", the name of thee-commerce website for the second payment transaction is "xyz.com, Inc.", and the webpage identifier of the e-commerce website for the second payment transaction is "www.xyz.com". While the merchant category code associated with the e-commerce website for the first payment transaction is "9971", the name of the e-commerce website for the first payment transaction is "xyz.com, Inc.", and the webpage identifier of thee-commerce website for the first payment transaction is www.xyz.com. As a result, all of the second transaction parameters match with the first transaction parameters, so the method takes the Yes branch of step 448 to step 452. In another example, if any one of the second transaction parameters matches the first transaction parameters, then the method takes the Yes branch of step 448 to step 452. By way of example, when any one of the merchant category code, the name of the e-commerce website, or the webpage identifier matches the corresponding first transaction parameters, then the method takes the Yes branch of step 448 to step 452. In yet another example, only if a merchant category code of the second transaction parameters matches the corresponding the merchant category code of the first transaction parameters, then the method takes the Yes branch of step 448 to step 452. In yet another example, when any two of the merchant category code, the name of the e-commerce website, and/or the webpage identifier match with the corresponding first transaction parameters, then the method takes the Yes branch of step 448 to step 452. Any combination and number of second transaction parameters may be matched with the first transaction parameters.

Service provider system 104 in step 452 authorizes the second payment transaction, and process 400 ends.

Referring back to FIG. 4A, in step 420 service provider system 104 determines if the webpage identifier associated with the e-commerce website, where customer 114(1) is performing a third payment transaction, is a trusted merchant webpage identifier. In this example, the webpage identifier associated with thee-commerce website, where customer 114(1) performed the first payment transaction is www.amazon.com.

Based on the comparison performed in step 418, service provider system 104 determines that the www.amazon.com webpage identifier associated with thee-commerce website does match to the list of trusted merchant webpage identifiers stored in the database 106, thus the service provider system 104 determines that the www.amazon.com webpage identifier is a trusted merchant webpage identifier as part of a third payment transaction. Upon determining that the www.amazon.com webpage identifier is a trusted merchant webpage identifier, service provider system 104 takes the Yes branch at step 420 and proceeds to step 454 of FIG. 4D.

Figure 4D:
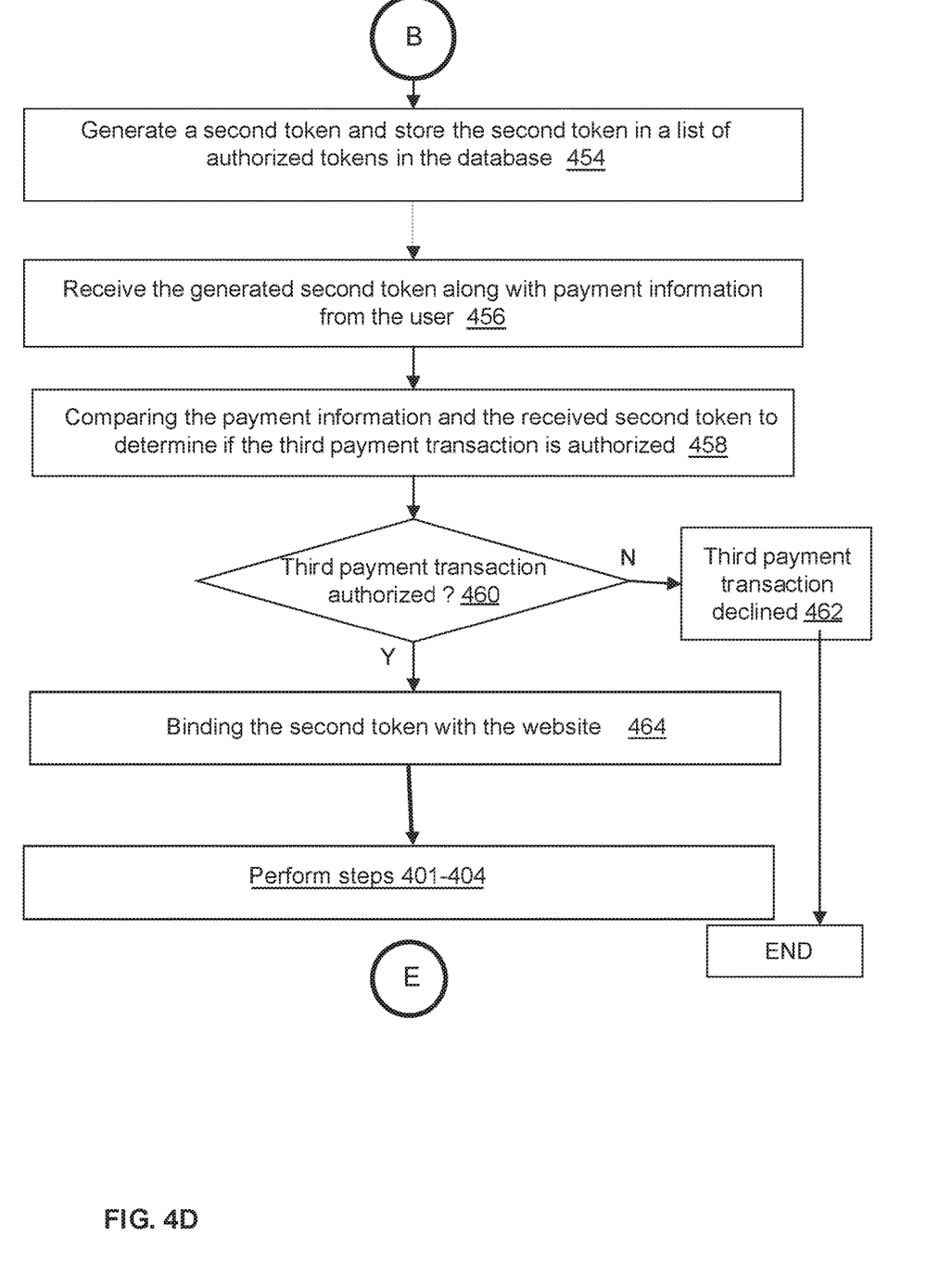

Service provider system 104 in step 454 generates a second token that is unique to the e-commerce website of www.amazon.com, where customer 114(1) is performing the third payment transaction.

In step 454, service provider system 104 generates a second token which in this example is independent of a merchant webpage identifier or payment information. Service provider system 104 determines that customer 114(1) is logged into their bank account and associates the generated second token with the bank account of customer 114(1). The user may then proceed to utilize the second token at a merchant webpage of their choice for payment processing, the merchant webpage having a merchant identifier. The second token may be a 16-digit unique number that the user may input in a credit card number field on a payment interface and utilized for payment authorization. Upon successful payment authorization of payment at the merchant, the merchant website identifier is then bounded to the second token.

Service provider system 104 may receive user payment information from customer 114(1) as part of the third payment transaction. The user payment information may be received as an input from customer 114(1) via the e-commerce website. The user payment information may include credit card number, debit card number, bank account number, or any other financial account number that may be utilized to provide payment for the third payment transaction. Service provider system 104 associates and stores in database 106, the webpage identifier associated with the e-commerce website, where customer 114(1) is performing the third payment transaction and the payment information received from customer 114(1). The generated second token is then associated with the received payment information and/or merchant information (e.g., merchant webpage identifier associated with the e-commerce website) and stored in database 106. Service provider system 104 generates a virtual number that is associated to the webpage identifier corresponding with the e-commerce website, where customer 114(1) is performing the third payment transaction. The generated virtual number may be a sequence of numbers determined by service provider system 104, where customer 114(1) is performing the third payment transaction. The virtual number is also referred to as the second token, where customer 114(1) is performing the third payment transaction. The association of the generated second token with the received payment information and the webpage identifier is also referred to herein as binding the second token with the payment information and the webpage identifier. In this example, the second token is "123459", although any other number may also be associated. The second token is then included in a list of authorized tokens stored in database 106. The second token is then displayed on the e-commerce website for customer 114(1) to view. The customer 114(1) may then utilize the second token. The second token provides advantages as that of the first token, of protecting credit card numbers from being compromised and thus this technology provides the advantage of avoiding replacements of physical credit cards. By utilizing tokens in place of credit card numbers customers, credit card numbers will not be compromised.

Service provider system 104 in step 456 receives the generated second token along with payment information from customer 114(1) via the interface displayed on the e-commerce website. The second token displayed in step 454 is inputted by customer 114(1) in an input box displayed on the e-commerce website in step 456.

In another example, in step 454 the second token may be stored on the web browser of user device 102(1) and in step 456 the second token may be retrieved from the web browser and automatically entered into the input box displayed on the e-commerce website in step 456 by service provider system 104, upon generating the second token.

Service provider system 104 in step 458 compares the received payment information and/or merchant information (e.g., webpage identifier associated with thee-commerce website) bound to the second token received in step 456 to determine if the payment transaction is authorized. Service provider system 104 compares the received payment information with merchant information associated with the account that corresponds to the received token that is previously stored. When service provider system 104 determines that the merchant information bound with the account that corresponds to the received token matches with the received payment information, then service provider system 104 determines that the first payment transaction is authorized.

When service provider system 104 determines that the merchant information associated with the account that corresponds to the received token does not match with the received payment information, then service provider system 104 determines that the first payment transaction is not authorized.

Service provider system 104 in step 460 determines if the third payment transaction has been authorized. When service provider system 104 determines that the third payment transaction is not authorized, then process 400 takes the No branch of step 460 to step 462. In step 462, service provider system 104 determines that the third payment transaction has been declined and process 400 ends.

When service provider system 104 determines that the third payment transaction is authorized, then process takes the Yes branch of step 460 to step 464.

Service provider system 104 in step 464, binds the second token with the websites and the process loops back to step 400. Service provider system 104 performs steps 401-404. In step 401, service provider system 104 determines customer 114(1) to be at a payment gateway to perform a fourth payment transaction, performs steps 401-404, and then proceeds to step 466.

In this method, service provider system 104 stores third transaction parameters and associates it with the second token, similar to steps 432 and 434 as explained above. The third transaction parameters may include merchant category code associated with the e-commerce website associated with the third payment transaction, a name of the e-commerce website associated with the third payment transaction, a masked name of the e-commerce website associated with the third payment transaction, and/or a webpage identifier of the e-commerce website associated with the third payment transaction.

Figure 4E:
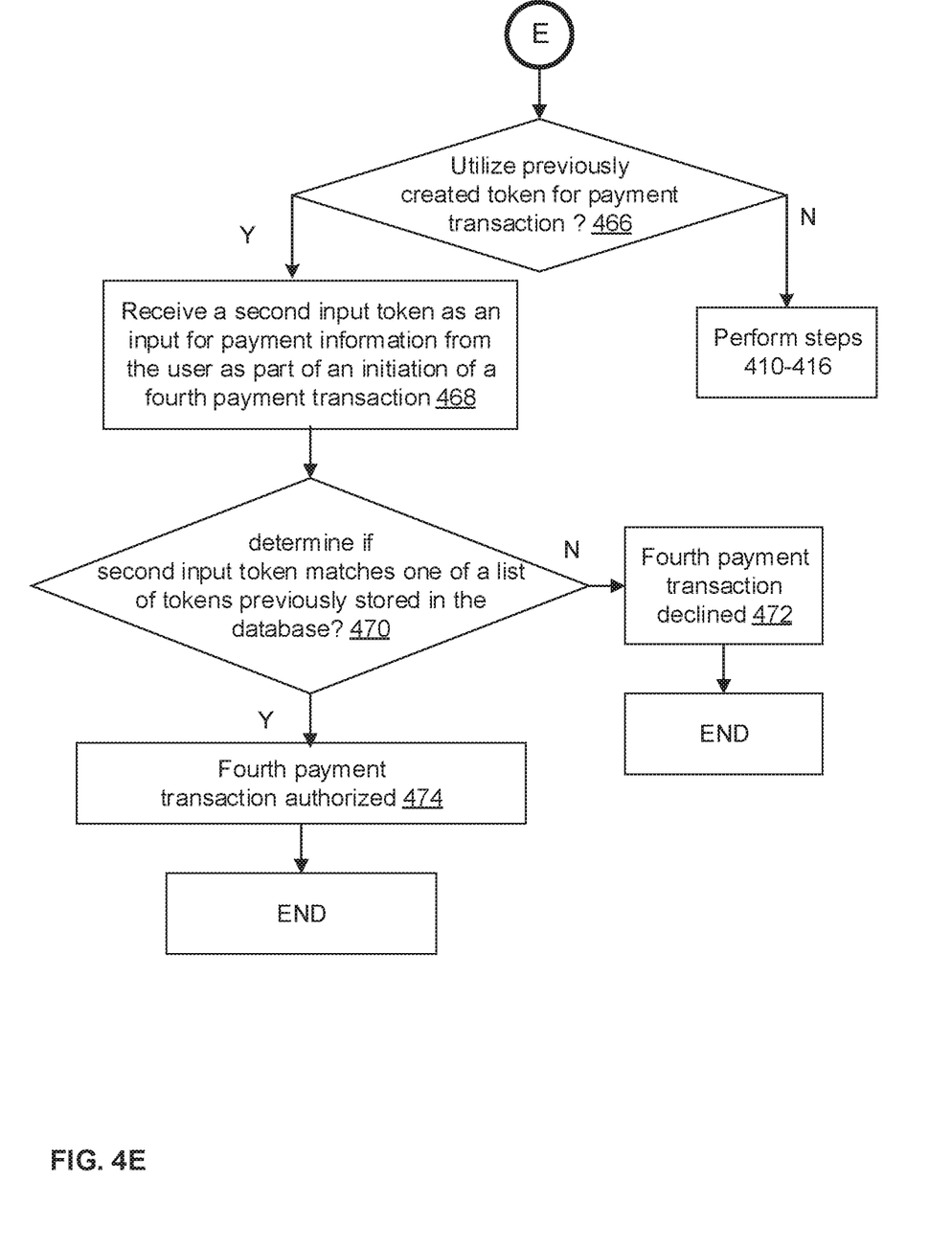

Upon reaching the step 466, service provider system 104 may display a prompt on the e-commerce website asking if customer 114(1) has previously generated a unique token at the e-commerce website. In this example, the second token is the previously generated unique token, that the user would like to utilize to purchase an item as part of the fourth payment transaction. The prompt displayed on the website may display a message such as "Would you like to utilize a previously generated token?," with two option of "Yes" or "No" to select from. When customer 114(1) selects the "Yes" option, service provider system 104 determines that customer 114(1) would like to utilize the generated unique token and process 400 takes the Yes branch of step 466 to step 468.

Service provider system 104 in step 468 receives the second token as an input for payment information from customer 114(1) as part of an initiation of the fourth payment transaction. Second token is received along with payment information which includes merchant account information associated with the e-commerce website (e.g., merchant account number associated with a bank, etc.), phone number associated with the e-commerce website, location information associated with the e-commerce website (state, address, etc.), although any other transaction parameter associated with a transaction may also be included. The received second token is referred to as a second input token. In this example, the second input token is "123459", although any other number may also be associated. As part of the prompt displayed in step 466, service provider system 104 displays an input box to input the token for initiating the fourth payment transaction. Service provider system 104 initiates processing of the fourth payment transaction upon receiving from customer 114(1) the second input token as an input in the input box. As part of initiating the processing of the fourth payment transaction, service provider system 104 generates a fourth payment authorization request based on the second input token and process 400 proceeds to step 470.

Service provider system 104 in step 470 determines if the received second input token matches one of a list of tokens previously stored in database 106. Service provider system 104 compares the second input token with the list of authorized tokens stored in database 106. Service provider system 104 determines if the second input token matches a token from the list of authorized tokens. When service provider system 104 determines that the second input token does not match with any of the tokens included in the list of authorized tokens, then service provider system 104 determines that the fourth payment transaction is not authorized and the method takes the No branch of step 470 to step 472. In step 472, service provider system 104 determines that the fourth payment transaction has been declined and process 400 ends.

When service provider system 104 determines that the received second input token matches a token in the list of authorized tokens, then service provider system 104 determines that the fourth payment transaction is authorized, and process 400 takes the Yes branch of step 470 to step 474. In this example, service provider system 104 determines that the received second input token "123459", matches the second token "123459" stored in the list of authorized tokens.

In another example, service provider system 104 may identify third transaction parameters associated with the determined second token stored in the list of authorized tokens, and then compare the received transaction parameters associated with the received second input token with the third transaction parameters. By way of example, upon determining that one or more of the received transaction parameters associated with the received second input token match with corresponding one or more of the third transaction parameters, then the transaction authorized. Service provider system 104 in step 474 authorizes the fourth payment transaction, and process 400 ends. When, upon determining that one or more of the received transaction parameters associated with the received second input token do not match with corresponding one or more of the third transaction parameter, then the transaction is not authorized. Service provider system 104 in step 472, and process ends In step 406, when the customer 114(1) selects the "No" option, service provider system 104 determines that customer 114(1) would not like to utilize a token and the method takes the No branch of step 406 to step 410.

Service provider system 104 in step 410, receives user payment information from customer 114(1) as part of the fourth payment transaction. The user payment information may be received as an input from customer 114(1) via the e-commerce website. In response to receiving the user payment information, service provider system 104 generates a fourth payment transaction authorization request.

Service provider system 104 in step 412, in response to the fourth payment transaction authorization request generated in step 410, processes the received payment information to authorize the payment. When service provider system 104 determines that the payment information is valid, then the process 400 takes the Yes branch of step 412 and proceeds to the step 414. In step 414, service provider system 104 approves the fourth payment transaction and process 400 ends. When service provider system 104 determines that the payment information is not valid, then the method takes the No branch of step 412 and proceeds to step 416. In step 416, service provider system 104 declines the fourth payment transaction and process 400 ends.

The above embodiments disclose benefits of binding unique tokens with merchant identifiers to authorize transactions. As described above, customers generate and utilize a unique token to conduct a payment transaction at an e-commerce website. Further, the unique token is bound to the e-commerce website and can be utilized only at the e-commerce website to which it is bound. By way of example, a unique token generated for the www.amazon.com website can only be utilized at the www.amazon.com website and cannot be utilized at any other website. The customers payment information is associated with the unique token, and thus for any payment transactions, the customer may need only to provide their unique token in place of the payment information. By utilizing unique tokens, customers are provided the advantage of not providing their payment information (e.g., credit card number, debit card number, etc.) for payment transaction. Since the customers do not have to provide their payment information, the customers need not worry about payment security fraud and/or online theft while of their payment information is entered online. The disclosed embodiments provide a solution for problems including, but not limited to, online payment fraud, financial loss, etc.

The above embodiments disclose benefits for binding unique tokens with merchant identifiers to authorize transactions. While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The elements in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with a true scope and spirit being indicated by the following claims and their full scope of equivalents.

What is claimed is:

1. A system for configuring access tokens with Uniform Resource Locator (URL) parameters to authorize web-browser-initiated network operations, the system comprising:
one or more memory devices storing instructions; and
one or more processors executing computer program instructions that, when executed, cause operations comprising:
monitoring web browsing interactions with a web browsing application on a user device associated with a user accessing a first website;
detecting, based on the monitoring of the web browsing interactions, a user input at a data exchange gateway associated with the first website to perform a first network operation, wherein the first network operation is associated with a request to access resources associated with the first website;
in response to the detected user input, generating an access token at the web browsing application, based on user account information associated with the user, wherein the access token is associated with (i) an authentication credential and (ii) one or more network operation parameters;
receiving an authorization request to authorize the first network operation, wherein the authorization request comprises (i) the access token and (ii) first network operation parameters related to the request to access the resources associated with the first website;
in response to a successful authorization of the first network operation based on the authorization request, binding the access token to a first URL domain network operation parameter associated with the first website, wherein subsequent use of the access token is restricted to websites associated with the first URL domain network operation parameter;
receiving a second authorization request to authorize a second network operation, wherein the second authorization request comprises (i) the access token and (ii) second network operation parameters related to second resources associated with a second website, the second network operation parameters comprising a respective second network operation parameter that does not match the first URL domain network operation parameter; and
in response to a lack of a match between the respective second network operation parameter of the second network operation parameters and the first URL domain network operation parameter, denying the second authorization request, wherein the respective second network operation parameter lacks the match to the first URL domain network operation parameter.

2. The system of claim 1, the operations further comprising:
receiving a third authorization request to authorize a third network operation, wherein the third authorization request comprises (i) the access token and (ii) third network operation parameters related to third resources associated with a third website; and
in response to a matching between a respective third network operation parameter of the third network operation parameters and the first URL domain network operation parameter, approving the third authorization request.

3. A method comprising:
detecting a user input from a user at a data exchange gateway associated with a first website to perform a first network operation, wherein the first network operation is associated with a request to access resources associated with the first website;
in response to the detected user input, generating an access token based on user specific information associated with the user, wherein the access token is associated with one or more network operation parameters;
receiving an authorization request to authorize the first network operation, wherein the authorization request comprises (i) the access token and (ii) first network operation parameters, the first network operation being successfully authorized based on the authorization request;
in response to the successful authorization of the first network operation based on the authorization request, binding the access token to a first URL identifier parameter associated with the first website;
receiving a second authorization request to authorize a second network operation, wherein the second authorization request comprises (i) the access token and (ii) second network operation parameters related to second resources associated with a second website, the second network operation parameters comprising a respective second network operation parameter that matches the first URL identifier parameter; and
in response to a matching between the respective second network operation parameter of the second network operation parameters and the first URL identifier parameter, approving the second authorization request, wherein the respective second network operation parameter matches the first URL identifier parameter.

4. The method of claim 3, further comprising:
receiving a third authorization request to authorize a third network operation, wherein the third authorization request comprises (i) the access token and (ii) third network operation parameters related to third resources associated with a third website, the third network operation parameters comprising a respective third network operation parameter that does not match the first URL identifier parameter; and
in response to a lack of a match between the respective third network operation parameter of the third network operation parameters and the first URL identifier parameter, denying the third authorization request, wherein the respective third network operation parameter lacks the match to the first URL identifier parameter.

5. The method of claim 4, wherein the denying of the third authorization request prevents access to the third resources associated with the third website.

6. The method of claim 3, wherein generating the access token further comprises:
receiving the user input from the user, wherein the user input indicates an intent to generate the access token;
comparing a first website identifier associated with the first website to a set of predetermined website identifiers, the comparison indicating that the first website identifier fails to match at least one of the predetermined website identifiers of the set of predetermined website identifiers; and
generating the access token in response to the first website identifier failing to match the at least one of the predetermined website identifiers of the set of predetermined website identifiers.

7. The method of claim 3, further comprising:
receiving the user input from the user, wherein the user input indicates an intent to use a previously generated token;
determining that a first website identifier associated with the first website matches at least one network operation parameter of a previously generated access token; and
in response to the first website identifier matching the at least one network operation parameter of the previously generated access token, using the previously generated access token to authorize the first network operation.

8. The method of claim 3, further comprising:
subsequent to the access token being bound to the first URL identifier parameter, storing the access token bound to the first URL identifier parameter in a database.

9. The method of claim 3, wherein the binding restricts subsequent use of the access token to websites associated with the first URL identifier parameter.

10. The method of claim 3, further comprising:
generating for display, on a user interface associated with a user device of the user, the access token.

11. The method of claim 3, wherein the successful authorization enables access to the resources associated with the first website.

12. One or more non-transitory computer-readable media comprising instructions that, when executed by one or more processors, cause operations comprising:
detecting a user input from a user at a first website to perform a first network operation, wherein the first network operation is associated with a request to access resources associated with the first website;
in response to the detected user input, generating an access token, wherein the access token is associated with one or more token parameters, wherein generating the access token further comprises receiving the user input from the user, wherein the user input indicates an intent to generate the access token, comparing a first identifier associated with the first website to a set of predetermined identifiers, and generating the access token in response to the first identifier failing to match at least one of the predetermined identifiers of the set of predetermined identifiers;
receiving an authorization request to authorize the first network operation, wherein the authorization request comprises the access token; and
in response to a successful authorization of the first network operation based on the authorization request, binding the access token to a first website identifier associated with the first website, wherein, in connection with the binding, subsequent use of the access token is restricted to websites associated with the first website identifier.

13. The media of claim 12, the operations further comprising:
receiving a second authorization request to authorize a second network operation, wherein the second authorization request comprises the access token; and
in response to a lack of a match between a second network operation parameter associated with the second network operation and the first website identifier associated with the access token, denying the second authorization request.

14. The media of claim 13, wherein the denying of the second authorization request prevents access to resources associated with the second network operation.

15. The media of claim 12, the operations further comprising:
receiving a third authorization request to authorize a third network operation, wherein the third authorization request comprises the access token; and
in response to a matching between a third network operation parameter associated with the third network operation and the first website identifier associated with the access token, approving the third authorization request.

16. The media of claim 12, the operations further comprising:
receiving the user input from the user, wherein the user input indicates an intent to use a previously generated token;
determining whether an identifier associated with the first website matches at least one network operation parameter of a previously generated access token; and
in response to the identifier matching the at least one network operation parameter of the previously generated access token, using the previously generated access token to authorize the first network operation.

17. The media of claim 12, the operations further comprising:
subsequent to the access token being bound to the first website identifier, storing the access token bound to the first website identifier in a database.

18. The media of claim 12, the operations further comprising:
generating for display, on a user interface associated with a user device of the user, the access token.

19. The media of claim 12, wherein the successful authorization enables access to the resources associated with the first website.

* * * * *